United States Patent
Yue et al.

(10) Patent No.: US 12,392,009 B2
(45) Date of Patent: Aug. 19, 2025

(54) HIGH-GRADE NON-ORIENTED SILICON STEEL AND PRODUCTION METHOD THEREOF

(71) Applicants: INSTITUTE OF RESEARCH OF IRON AND STEEL, JIANGSU PROVINCE/SHA-STEEL, CO. LTD (CN), Jiangsu (CN); ZHANGJIAGANG YANGTZE RIVER COLD ROLLED PLATE CO. LTD, Jiangsu (CN); JIANGSU SHAGANG GROUP CO., LTD., Jiangsu (CN)

(72) Inventors: Chongxiang Yue, Suzhou (CN); Shengjie Wu, Suzhou (CN); Jiadong Lu, Suzhou (CN); Hui Li, Suzhou (CN)

(73) Assignees: INSTITUTE OF RESEARCH OF IRON AND STEEL, JIANGSU PROVINCE/SHA-STEEL, CO. LTD (CN), Jiangsu (CN); ZHANGJIAGANG YANGTZE RIVER COLD ROLLED PLATE CO. LTD, Jiangsu (CN); JIANGSU SHAGANG GROUP CO., LTD., Jiangsu (CN)

(*) Notice: Subject to any disclaimer, the term of this patent is extended or adjusted under 35 U.S.C. 154(b) by 384 days.

(21) Appl. No.: 18/247,814

(22) PCT Filed: Jul. 19, 2021

(86) PCT No.: PCT/CN2021/107028
§ 371 (c)(1),
(2) Date: Apr. 4, 2023

(87) PCT Pub. No.: WO2022/127104
PCT Pub. Date: Jun. 23, 2022

(65) Prior Publication Data
US 2023/0332264 A1    Oct. 19, 2023

(30) Foreign Application Priority Data
Dec. 16, 2020  (CN) .................. 202011486898.X (51) Int. Cl.
| | | |
|---|---|---|
| C23G 1/08 | (2006.01) |
| B22D 11/00 | (2006.01) |
| C21D 6/00 | (2006.01) |
| C21D 8/02 | (2006.01) |
| C21D 9/52 | (2006.01) |
| C22C 33/04 | (2006.01) |
| C22C 38/00 | (2006.01) |
| C22C 38/02 | (2006.01) |
| C22C 38/04 | (2006.01) |
| C22C 38/06 | (2006.01) |
| C22C 38/34 | (2006.01) |
| C22C 38/42 | (2006.01) |
| C22C 38/44 | (2006.01) |
| C22C 38/46 | (2006.01) |

(Continued)

(52) U.S. Cl.
CPC .............. *C21D 9/52* (2013.01); *B22D 11/001* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0263* (2013.01); *C21D 8/0278* (2013.01); *C22C 33/04* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C23G 1/08* (2013.01); *C22C 2202/02* (2013.01)

(58) Field of Classification Search
None
See application file for complete search history.

(56) References Cited

FOREIGN PATENT DOCUMENTS

| | | | |
|---|---|---|---|
| CN | 101139681 A | 3/2008 | |
| CN | 110592460 A | * 12/2019 | ............. C22C 38/06 |
| CN | 112030059 A | 12/2020 | |

(Continued)

OTHER PUBLICATIONS

International Search Report in International application No. PCT/CN2021/107028 mailed on Oct. 11, 2021, with English translation provided by WIPO.

(Continued)

*Primary Examiner* — Anthony M Liang
(74) *Attorney, Agent, or Firm* — Ladas & Parry, LLP (57) ABSTRACT

A high-grade non-oriented silicon steel and a production method are provided. The non-oriented silicon steel includes the following chemical components in percent by mass: 0.002-0.004% of C, not greater than 0.003% of S, 1.4-1.7% of Si, 0.7-0.95% of Mn, not greater than 0.03% of P, 0.015-0.035% of Sn; and $11\times([Si]-1.4\%)=14\times([Mn]-0.7\%)$. In the production method, the heating temperature of a continuous casting billet is 1,120-1,150° C.; the finishing temperature in finish rolling is 890±15° C.; the rolling reduction of the last pass of finish rolling is not less than 30%, the total rolling reduction of the last two passes of finish rolling is not less than 50%, and the coiling temperature is 650±20° C.; normalizing treatment is avoided before acid continuous rolling.

8 Claims, 1 Drawing Sheet

(51) Int. Cl.
*C22C 38/48* (2006.01)
*C22C 38/50* (2006.01)

(56) References Cited

FOREIGN PATENT DOCUMENTS

| | | |
|---|---|---|
| CN | 112609130 A | 4/2021 |
| KR | 1020020012643 A | 2/2002 |

OTHER PUBLICATIONS

Written Opinion of the International Searching Authority in International application No. PCT/CN2021/107028 mailed on Oct. 11, 2021, with English translation provided by WIPO.

* cited by examiner

HIGH-GRADE NON-ORIENTED SILICON STEEL AND PRODUCTION METHOD THEREOF

CROSS-REFERENCE TO RELATED APPLICATIONS

This application is the U.S. national phase of PCT Application No. PCT/CN2021/107028, which claims priority to Chinese Patent Application 202011486898.X, entitled "HIGH-GRADE NON-ORIENTED SILICON STEEL AND PRODUCTION METHOD THEREOF" filed with the Patent Office of China on Dec. 16, 2020, the disclosures of which are incorporated herein by reference in their entireties.

TECHNICAL FIELD

The present invention belongs to the technical field of steel material preparation, relates to high-grade non-oriented silicon steel, and also relates to a production method of the high-grade non-oriented silicon steel.

BACKGROUND

Non-oriented silicon steel is an iron core material of a motor and a generator rotor working in a rotary magnetic field, and it requires good magnetic properties including lower iron loss and higher magnetic induction intensity. According to the technical standards and technical protocols of various countries, the non-oriented silicon steel with the iron loss $P_{1.5/50} \leq 4.00$ W/kg is generally referred to as high-grade non-oriented silicon steel, and the high-grade non-oriented silicon steel is mainly divided into four categories according to thickness: 0.35 mm thickness series, 0.50 mm thickness series, special thick specification series and special thin specification series. The high-grade non-oriented silicon steel is mainly applied to large electrical machines, small and medium-sized efficient electrical machines, energy-saving household appliances, electrical machines for electric vehicles, small and special electrical machines, precision instruments and meters and other instrument products.

In chemical components of the non-oriented silicon steel, Si is a main element influencing the iron loss, and the iron loss value of the non-oriented silicon steel is reduced generally with the increase of the Si content, that is, the chemical component of the high-grade non-oriented silicon steel is high silicon steel generally. However, the increase of the Si content makes the austenite-ferrite phase-change temperature higher or no phase transition, so in the production process of the high-grade non-oriented silicon steel, finishing of finish rolling is generally carried out in a low-temperature ferrite region, and a deformed ferrite structure after rolling cannot be recrystallized to obtain a deformed fiber structure. If a hot-rolled coil containing such fiber structure is directly subjected to cold rolling and finished product annealing, the obtained finished product has fine grains, the surface is easy to have corrugation defects, and the magnetic performance is poor and even does not reach the standard.

The conventional effective method for solving the problems above is to carry out normalizing treatment on the hot-rolled coil before cold rolling, and the deformed fiber structure of the ferrite can be recrystallized by the normalizing treatment so as to improve the magnetic performance of the finished product, remove the surface corrugation defect and improve the quality of the finished product to meet the production requirement for the high-grade non-oriented silicon steel. However, the normalizing treatment process is added, so the production process of the high-grade non-oriented silicon steel is more complicated, the production difficulty is improved, the device investment is increased, the production cost is greatly increased, and moreover, the production line cannot be universally used on low-grade, medium-grade and high-grade products and has poor universality.

SUMMARY

In order to solve the technical problems of carrying out normalizing treatment in a production process of high-grade non-oriented silicon steel in the prior art, an objective of the present invention is to provide a production method of high-grade non-oriented silicon steel without normalizing treatment, and high-grade non-oriented silicon steel prepared by the production method.

In order to achieve the objective above, one embodiment of the present invention provides high-grade non-oriented silicon steel, the high-grade non-oriented silicon steel includes the following chemical components in percent by mass: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities; and $11\times([Si]-1.4\%)=14\times([Mn]-0.7\%)$.

Further, in a case that the thickness of a finished product of non-oriented silicon steel is 0.500±0.005 mm, the iron loss is shown as $P_{1.5/50} \leq 3.8$ W/kg, and the magnetic induction intensity is shown as $B_{5000} \geq 1.71$;

or, in a case that the thickness of the finished product of the non-oriented silicon steel is 0.350±0.004 mm, the iron loss is shown as $P_{1.5/50} \leq 3.3$ W/kg, and the magnetic induction intensity is shown as $B_{5000} \geq 1.70$.

In order to achieve the objective above, one embodiment of the present invention further provides a production method of the high-grade non-oriented silicon steel. The production method includes the following steps:

1) smelting steel by molten iron desulfurization, converter smelting and RH refining in sequence, the finally obtained molten steel including the following chemical components in percent by mass: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities, and $11\times([Si]-1.4\%)=14\times([Mn]-0.7\%)$;

2) continuously casting the molten steel obtained in step 1 into a continuous casting billet with the thickness of more than 200 mm;

3) heating the continuous casting billet obtained in step 2 to reach 1,120-1,150° C., and maintaining the temperature for more than 200 min; then carrying out multi-pass rough rolling to obtain an intermediate billet with the thickness of 40-45 mm; and then carrying out multi-pass finish rolling, cooling and coiling to obtain a hot-rolled coil with the thickness of 2.50±0.1 mm, the finishing temperature in finish rolling being 890±15° C., the rolling reduction of the last pass of finish rolling being not less than 30%, the total rolling reduction of the last two passes of finish rolling being not less than 50%, and the coiling temperature being 650±20° C.;

4) carrying out uncoiling, acid pickling, rinsing, drying, cold rolling and coiling on the hot-rolled coil obtained in step 3, rather than carrying out normalizing treatment, thereby obtaining a cold hard coil with the thickness of 0.500±0.005 mm or 0.350±0.004 mm; and 5) carrying out finished product annealing on the cold hard coil obtained in step 4 in a mixed atmosphere of $H_2+N_2$ through a continuous annealing furnace, the finished product annealing temperature being 920-980° C., and the annealing time being 60±5 s; and carrying out cooling, coating and finishing on the annealed steel strip to obtain a finished product of non-oriented silicon steel.

Preferably, in step 3, the continuous casting billet obtained in step 2 is heated to reach 1,130-1,150° C., and the temperature is maintained for more than 200 min.

Preferably, in step 3, in the cooling process, two-stage cooling is carried out on the steel plate obtained by finishing in finish rolling, the previous-stage cooling is natural slow cooling without water cooling and lasts for 3-8 s, and the later-stage cooling is water-cooling rapid cooling.

Preferably, in the molten iron desulphurization process, the temperature of desulphurized molten iron is controlled to be not less than 1,320° C., the content of S is not greater than 0.0015% by mass, and the slagging-off rate is not less than 98%;

in the converter smelting process, the desulphurized molten iron is mixed with scrap steel to be smelted in a converter, and the scrap steel accounts for 20-25% of the total mass of the molten steel; in the tapping process, a sufficient quantity of tin ingots are added into the molten steel according to the ratio of 0.015-0.035% of Sn in the finished product; and after tapping is finished, a slag top deoxidizing agent is added into the molten steel;

in the RH refining process, the molten steel is subjected to decarburization treatment in a pre-vacuumized RH refining furnace; then ultra-low titanium ferrosilicon and metal manganese are added into the molten steel according to an alloying solution that the finished product contains 1.4-1.7% of Si, and 0.7-0.95% of Mn, and $11\times([Si]-1.4\%)=14\times([Mn]-0.7\%)$; tapping is carried out more than 7 min after net circulation; and a desulfurizing agent is added into the molten steel for deep desulfurization treatment during net circulation.

Preferably, in the acid pickling process, the hot-rolled coil obtained in step 3 is uncoiled and then subjected to three-stage acid pickling through HCl; where the concentration of first-stage acid liquor is 50-80 g/L, and the concentration of $Fe^{2+}$ in the acid liquor is not greater than 130 g/L; the concentration of second-stage acid liquor is 90-120 g/L, and the concentration of $Fe^{2+}$ in the acid liquor is not greater than 90 g/L; the concentration of third-stage acid liquor is 140-160 g/L, and the concentration of $Fe^{2+}$ in the acid liquor is not greater than 50 g/L;

during each-stage acid pickling, the temperature of the acid liquor is 75-85° C., the acid liquor contains a silicon steel acid pickling accelerant, and the silicon steel acid pickling accelerant accounts for 0.05-0.10% of the acid liquor by weight; and the temperature of rinsing water is 45-55° C., and the acid pickling and rinsing speed is controlled to be 100-180 mpm.

Preferably, in step 5, the steel strip obtained after finished product annealing is subjected to three-stage cooling; the first-stage cooling is high-temperature-stage slow cooling, and the steel strip is cooled from annealing temperature to 850° C. at a cooling speed of not greater than 5° C./s; the second-stage cooling is circulating gas jet controlled cooling, and the steel strip is continuously cooled from 850° C. to 350° C. or below at a cooling speed of not greater than 15° C./s; and the third-stage cooling is circulating water jet cooling, and the steel strip is continuously cooled from 350° C. to 100° C. or below.

In order to achieve the above objective of the present invention, another embodiment of the present invention further provides a production method of the high-grade non-oriented silicon steel. The production method includes the following steps:

1) smelting steel by molten iron desulfurization, converter smelting and RH refining in sequence, the finally obtained molten steel including the following chemical components in percent by mass: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities, and $11\times([Si]-1.4\%)=14\times([Mn]-0.7\%)$;

2) continuously casting the molten steel obtained in step 1 into a continuous casting billet with the thickness of more than 200 mm;

3) heating the continuous casting billet obtained in step 2 to reach 1,120-1,150° C., and maintaining the temperature for more than 200 min; then carrying out multi-pass rough rolling to obtain an intermediate billet with the thickness of 40-45 mm; then carrying out multi-pass finish rolling, and coiling to obtain a hot-rolled coil with the thickness of 2.50±0.1 mm, the finishing temperature in finish rolling being $(A_{r1}-40)\pm15°$ C., $A_{r1}$ representing the temperature for transformation from austenite to ferrite, the rolling reduction of the last pass of finish rolling being not less than 30%, the total rolling reduction of the last two passes of finish rolling being not less than 50%, and the coiling temperature being 650±20° C.; and carrying out two-stage cooling on the steel plate obtained by finishing in finish rolling before coiling, the previous-stage cooling being natural slow cooling without water cooling and lasting for 3-8 s, and the later-stage cooling being water-cooling rapid cooling;

4) carrying out uncoiling, acid pickling, rinsing, drying, cold rolling and coiling on the hot-rolled coil obtained in step 3, rather than carrying out normalizing treatment, thereby obtaining a cold hard coil with the thickness of 0.500±0.005 mm or 0.350±0.004 mm; and 5) carrying out finished product annealing on the cold hard coil obtained in step 4 in a mixed atmosphere of $H_2+N_2$ through a continuous annealing furnace, the finished product annealing temperature being 920-980° C., and the annealing time being 60±5 s; and carrying out cooling, coating and finishing on the annealed steel strip to obtain a finished product of non-oriented silicon steel.

Preferably, in step 3, the continuous casting billet obtained in step 2 is heated to reach 1,130-1,150° C., and the temperature is maintained for more than 200 min.

Preferably, in step 3, $A_{r1}$ is 933° C., and the finishing temperature in finish rolling is 893±15° C.

Preferably, in the molten iron desulphurization process, the temperature of desulphurized molten iron is controlled to be not less than 1,320° C., the content of S is not greater than 0.0015% by mass, and the slagging-off rate is not less than 98%;

in the converter smelting process, the desulphurized molten iron is mixed with scrap steel to be smelted in a converter, and the scrap steel accounts for 20-25% of the total mass of the molten steel; in the tapping process, a sufficient quantity of tin ingots are added into the molten steel according to the ratio of 0.015-0.035% of Sn in the finished product; and after tapping is finished, a slag top deoxidizing agent is added into the molten steel;

in the RH refining process, the molten steel is subjected to decarburization treatment in a pre-vacuumized RH refining furnace; then ultra-low titanium ferrosilicon and metal manganese are added into the molten steel according to an alloying solution that the finished product contains 1.4-1.7% of Si, and 0.7-0.95% of Mn, and $11\times([Si]-1.4\%)=14\times([Mn]-0.7\%)$; tapping is carried out more than 7 min after net circulation; and a desulfurizing agent is added into the molten steel for deep desulfurization treatment during net circulation.

Preferably, in the acid pickling process, the hot-rolled coil obtained in step 3 is uncoiled and then subjected to three-stage acid pickling through HCl; where the concentration of first-stage acid liquor is 50-80 g/L, and the concentration of $Fe^{2+}$ in the acid liquor is not greater than 130 g/L; the concentration of second-stage acid liquor is 90-120 g/L, and the concentration of $Fe^{2+}$ in the acid liquor is not greater than 90 g/L; the concentration of third-stage acid liquor is 140-160 g/L, and the concentration of $Fe^{2+}$ in the acid liquor is not greater than 50 g/L;

during each-stage acid pickling, the temperature of the acid liquor is 75-85° C., the acid liquor contains a silicon steel acid pickling accelerant, and the silicon steel acid pickling accelerant accounts for 0.05-0.10% of the acid liquor by weight; and the temperature of rinsing water is 45-55° C., and the acid pickling and rinsing speed is controlled to be 100-180 mpm.

Preferably, in step 5, the steel strip obtained after finished product annealing is subjected to three-stage cooling; the first-stage cooling is high-temperature-stage slow cooling, and the steel strip is cooled from annealing temperature to 850° C. at a cooling speed of not greater than 5° C./s; the second-stage cooling is circulating gas jet controlled cooling, and the steel strip is continuously cooled from 850° C. to 350° C. or below at a cooling speed of not greater than 15° C./s; and the third-stage cooling is circulating water jet cooling, and the steel strip is continuously cooled from 350° C. to 100° C. or below.

Compared with the prior art, the present invention has the following beneficial effects:

(1) according to the finished product of the high-grade non-oriented silicon steel prepared through the production method, the iron loss of the finished product with the thickness being 0.50 mm is shown as $P_{1.5/50} \leq 3.8$ W/kg, and the magnetic induction intensity is shown as $B_{5000} \geq 1.71$; the iron loss of the finished product with the thickness being 0.35 mm is shown as $P_{1.5/50} \leq 3.3$ W/kg, and the magnetic induction intensity is shown as $B_{5000} \geq 1.70$; therefore, the magnetic performance is excellent; the finished product of the high-grade non-oriented silicon steel can be obtained through a process production line of molten iron desulphurization, converter smelting, RH refining, continuous casting, hot rolling, acid continuous rolling, annealing, cooling, coating and finishing; the production line is universal for products of different grades, no extra process or device needs to be specially added for the high-grade non-oriented silicon steel; normalizing treatment does not need to be carried out before cold rolling, so that one technological process is avoided, and the production cost is low; and the requirements of electrical steel product upgrading and electric appliance product energy efficiency upgrading for low-cost high-grade silicon steel sheets can be met;

(2) on the design basis of elements such as Mn, S and N in the abovementioned chemical components and in combination with the control over the heating temperature (1,120-1,150° C.) and the temperature maintaining duration of the continuous casting billet, the production efficiency is guaranteed, the high-temperature finishing in subsequent finish rolling is facilitated, meanwhile, the probability of separating out fine MnS is reduced, and solid solution of precipitates such as MnS in the steel in the heating process is prevented; in addition, on the design basis of the elements such as Mn, C and Si in the chemical components, compared with the prior art, an austenite region is expanded, the temperature Ar for transformation from austenite to ferrite is reduced, and the Art can be kept basically constant; the thickness of the intermediate billet after rough rolling is controlled to be large, and the finishing temperature in finish rolling is controlled to be in a two-phase region or a high-temperature ferrite region, so that high-temperature ferrite, rather than a deformed fiber structure as described in the Background Art, can be formed, and the high-temperature ferrite is a basic condition for subsequent recrystallization; further, in combination with the large rolling reduction of the last two passes of finish rolling, the high-temperature ferrite formed during finishing has more internal storage energy, which is beneficial for recrystallization of the high-temperature ferrite and removal of the fiber structure; and meanwhile, the low coiling temperature and the large rolling reduction of the last two passes of finish rolling are further controlled, thus a problem that a compact oxide skin is formed and increases the removal difficulty of the oxide skin in subsequent acid pickling is avoided; and (3) the annealing temperature is controlled to be high, and therefore even though the size of grains formed by direct recrystallization of the hot-rolled coil is small, the magnetic performance of the finally-obtained finished product of the non-oriented silicon steel can be guaranteed; and in addition, according to the embodiment, although normalizing treatment is avoided, secondary cold rolling or secondary annealing does not need to be additionally carried out in the acid continuous rolling step and the annealing process, so that the whole production method is simple in operation and low in cost.

DETAILED DESCRIPTION

One embodiment of the present invention provides a production method of high-grade non-oriented silicon steel and high-grade non-oriented silicon steel prepared by the production method. The production method includes the processes of molten iron desulfurization, converter smelting, RH refining, continuous casting, hot rolling, acid continuous rolling, annealing, cooling, coating and finishing in sequence; and normalizing treatment is avoided before acid continuous rolling, and the obtained non-oriented silicon steel is excellent in magnetic performance, and free of surface corrugated defect, and meets the requirement for low-cost high-grade non-oriented silicon steel.

According to the embodiment, the non-oriented silicon steel includes the following chemical components in percent by mass according to a chemical component design solution: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities; and $11 \times ([Si]-1.4\%)=14 \times ([Mn]-0.7\%)$.

The effect of each element in the chemical component design solution is described as follows:

C: in the non-oriented silicon steel, C is generally considered as a harmful element; increase of the C content may lead to the problems of fine grains, high iron loss, low magnetic induction and magnetic aging of a finished product, so C is generally controlled to be in low content to the maximum; however, in the embodiment, the chemical components contain a small amount of C and the C content (in percent by mass) is controlled to be 0.002-0.004%, so that an austenite region can be expanded and the problem that the alloy addition amount is difficult to control because of C during production can be avoided.

Si: Si is an effective addition element which can improve the resistivity and reduce the iron loss, but the austenite region is reduced along with the increase of the Si content; when Si is more than 1.7%, no austenite phase change occurs; and in order to realize low iron loss and obtain the high-grade non-oriented silicon steel, the Si content (in percent by mass) is controlled to be 1.4-1.7%.

Mn: a proper amount of Mn can inhibit the thermal brittleness caused by S; the solid solubility of MnS in austenite is lower than that in a ferrite phase, so the MnS coarsening can be promoted, and the grain growth is facilitated; in this embodiment, Mn is added into the chemical component and the Mn content (in percent by mass) is controlled to be 0.7-0.95%, so that the austenite region can be expanded, and the austenite-ferrite transformation temperature can be reduced; and moreover, Mn and Si are increased and decreased synchronously, the content of Mn and Si meets a relationship of $11 \times ([Si]-1.4\%)=14 \times ([Mn]-0.7\%)$, and [Mn] and [Si] represent the content (in percent by mass) of Mn and Si respectively. According to the embodiment, the austenite-ferrite transformation temperature (namely the temperature $A_{r1}$ for transformation from austenite to ferrite described in the present invention) can be basically kept constant by controlling the content relationship of Mn and Si, and cannot fluctuate greatly along with the change of Si or Mn.

S: S is a harmful element, and the increase of S may lead to reduction of magnetic induction intensity and increase of iron loss. In this embodiment, in order to avoid separating out fine MnS in the hot rolling process, the content (in percent by mass) of S is controlled to be not greater than 0.003%.

P: P has little influence on magnetic performance, but the increase of the content of P can effectively improve the strength of a steel plate and improve the punching performance. In this embodiment, the intensity is high enough due to higher content of Si and Mn, so that P does not need to be specially added; and meanwhile, in order to avoid influence on realization of deep removal of S in the RH smelting process, the upper limit of the content of P does not need to be controlled too low, and is controlled to be not greater than 0.03%.

Sn: Sn is a grain boundary segregation element; and in this embodiment, Sn is added in chemical components, and the content (in percent by mass) of Sn is controlled to be 0.015-0.035%, so that the proportion of {111} adverse textures can be prominently reduced, and the magnetic induction intensity of finished products can be improved under the condition of not carrying out normalizing treatment.

Nb, V, Ti, Mo, Cr, Ni, Cu and N: a large amount of these elements may be adverse to growth of grains in the annealing process, resulting in deterioration of the magnetic performance of the non-oriented silicon steel so as to cause increment of the iron loss and reduction of the magnetic induction intensity, and therefore, the lower the content is in a controllable range, the better the effect is, for example, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, and not greater than 0.003% of N.

In general, in the aspect of chemical component design in this embodiment, the content of C, Si and Mn is designed; on the basis that the content of Si is increased to reduce the iron loss, C and Mn are added, the austenite region is expanded, and thus a situation that the austenite-ferrite transformation temperature is increased due to the increase of the content of Si is avoided; the austenite-ferrite transformation temperature is basically kept constant by controlling the content relationship between Mn and Si, conditions are created for removing deformed fiber structures of ferrite through hot rolling process control, and then the production technology without the normalizing treatment process is achieved; in addition, by designing the content of C, Si and Mn and controlling the S, P and other elements, the probability of separating out fine MnS in the hot rolling process is reduced; and Nb, V, Ti, Mo, Cr, Ni, Cu, N and Sn are controlled, so that the magnetic performance is guaranteed, and low iron loss and high magnetic induction intensity are achieved.

According to the embodiment, the production method of the high-grade non-oriented silicon steel includes the following steps:

1) Steel Smelting Step

This step includes the molten iron desulfurization process, the converter smelting process and the RH refining process; specifically, the abovementioned chemical components are subjected to molten iron desulfurization, converter smelting and RH refining in sequence for steel melting, that is, the molten steel finally obtained in the step includes the following components in percent by mass: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities, and 11×([Si]-1.4%)=14×([Mn]-0.7%).

Preferably, in the molten iron desulfurization process, the molten iron can be subjected to desulfurization treatment through a KR desulfurization technology; the temperature of desulphurized molten iron is controlled to be not less than 1,320° C., the content of S is not greater than 0.0015% by mass, that is, the content of S in the molten iron is controlled to be not greater than 0.0015% by mass through the molten iron desulfurization process; and the slagging-off rate of the desulfurized molten iron is controlled to be not less than 98%.

Preferably, in the converter smelting process, the tapped steel (namely desulfurized molten iron) in the molten iron desulfurization process is transferred into a converter and mixed with scrap steel in the converter; the desulfurized molten iron and the scrap steel are smelted in the converter; the scrap steel can be clean scrap steel, and the scrap steel accounts for 20-25% of the total mass of the molten steel (namely, the addition amount of the scrap steel accounts for 20-25% of the total amount of the scrap steel and the molten iron); in the tapping process, lime can be added into the molten steel, and then a sufficient quantity of tin ingots are added into the molten steel according to the ratio of 0.015-0.035% of Sn in the finished product; and after the tapping is finished, a slag top deoxidizing agent is added into the molten steel.

Preferably, the RH refining process is carried out in an RH refining furnace, and a decarburization treatment mode is adopted for treatment according to the sequence of pre-vacuumizing, decarburization, alloying, net circulation and vacuum breaking; specifically, in the pre-vacuumized RH refining furnace, decarburization treatment is carried out on the molten steel to control the mass percent of C contained in the molten steel; then alloying is carried out according to the Si content of 1.4-1.7% and the Mn content of 0.7-0.95% in the finished product and 11×([Si]-1.4%)=14×([Mn]-0.7%); ultra-low titanium ferrosilicon and metal manganese are added into the molten steel; tapping is carried out more than 7 min after net circulation; and the desulfurizing agent is added into the molten steel for deep desulfurization treatment during net circulation.

The tapping in the RH refining process is the final tapping of the steel smelting step; and the molten steel includes the following chemical components in percent by mass: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities, and 11×([Si]-1.4%)=14×([Mn]-0.7%).

2) Continuous Casting Step

This step is the continuous casting process, specifically, a continuous casting billet with the thickness of more than 200 mm, preferably 200-230 mm is prepared from the tapped steel in the RH refining step by a continuous casting device; and the specific operation of the continuous casting process can be realized by an existing feasible continuous casting technology, so no more description is made herein.

3) Hot Rolling Step

This step is the hot rolling process; the continuous casting billet obtained in step 2 is subjected to heating, multi-pass rough rolling, multi-pass finish rolling, cooling and coiling in sequence to prepare a hot-rolled coil.

Specifically, the continuous casting billet obtained in step 2 is heated to reach 1,120-1,150° C., and the temperature is maintained for more than 200 min; then multi-pass rough rolling is carried out to obtain an intermediate billet with the thickness of 40-45 mm; and finally multi-pass finish rolling, cooling and coiling are carried out to obtain the hot-rolled coil with the thickness of 2.50±0.1 mm.

The finishing temperature in finish rolling is $(A_{r1}-40)\pm15°$ C., and $A_{r1}$ represents the temperature for transformation from austenite to ferrite; the rolling reduction of the last pass of finish rolling is not less than 30%, the total rolling reduction of the last two passes of finish rolling is not less than 50%; and the coiling temperature is 650±20° C.

Therefore, on the design basis of elements such as Mn, S and N in the abovementioned chemical components and in combination with the control over the heating temperature (1,120-1,150° C.) and the temperature maintaining duration of the continuous casting billet, the production efficiency is guaranteed, the high-temperature finishing in subsequent finish rolling is facilitated, meanwhile, the probability of separating out fine MnS is reduced, and solid solution of precipitates such as MnS in the steel in the heating process is prevented; in addition, on the design basis of the elements such as Mn, C and Si in the chemical components, compared with the prior art, the austenite region is expanded, the temperature Ar1 for transformation from austenite to ferrite is reduced, and the Ar1 can be kept basically constant; the thickness of the intermediate billet after rough rolling is controlled to be large, and the finishing temperature in finish rolling is controlled to be in a two-phase region or a high-temperature ferrite region, so that high-temperature ferrite, rather than a deformed fiber structure as described in the Background Art, can be formed, and the high-temperature ferrite is a basic condition for subsequent recrystallization; further, in combination with the large rolling reduction of the last two passes of finish rolling, the high-temperature ferrite formed during finishing has more internal storage energy, which is beneficial for recrystallization of the high-temperature ferrite and removal of the fiber structure; and meanwhile, the low coiling temperature and the large rolling reduction of the last two passes of finish rolling are further controlled, thus a problem that a compact oxide skin is formed and increases the removal difficulty of the oxide skin in subsequent acid pickling is avoided In conclusion, through a series of abovementioned control, the objective of avoiding normalizing treatment before subsequent cold rolling is achieved; and it is guaranteed that the hot-rolled coil which is free of the fiber structure and cannot cause large acid pickling difficulty is obtained, and then the high-grade non-oriented silicon steel which is excellent in magnetic performance and free of surface corrugated defects is obtained.

Preferably, the heating temperature of the continuous casting billet can be preferably 1,130-1,150° C., that is, the continuous casting billet obtained in step 2 is heated to reach 1,130-1,150° C. and the temperature is maintained for more than 200 min.

Preferably, on the basis of the design of elements such as Mn, C and Si in the chemical components, the temperature Art for transformation from austenite to ferrite is basically maintained at about 930° C., for example, in an optional embodiment, the temperature $A_{r1}$ for transformation from austenite to ferrite is 933° C., namely, the finishing temperature in finish rolling is 893±15° C.; and in another optional embodiment, the temperature $A_{r1}$ for transformation from austenite to ferrite is 930° C., namely, the finishing temperature in finish rolling is 890±15° C. Therefore, the finishing temperature in finish rolling is controlled in the two-phase region or the high-temperature ferrite region while device operation feasibility is facilitated, and as a result, high-temperature ferrite is conveniently formed and formation of large grains is facilitated.

Preferably, in this step, in the cooling process, two-stage cooling is carried out on the steel plate obtained by finishing in finish rolling, the previous-stage cooling is natural slow cooling without water cooling and lasts for 3-8 s, and the later-stage cooling is water-cooling rapid cooling. Specifically, between finishing and coiling, the steel plate just leaving a finishing mill is not subjected to water cooling but is naturally cooled for about 3-8 s, and then water cooling is started to rapidly cool the steel plate to reach the coiling temperature of 650±20° C., for example, on a rollgang about 100 m between the finishing mill and a coiling machine, the steel plate is conveyed backwards in an air cooling way, rather than a water cooling way, through a rollgang of about 30-80 m close to the finishing mill; and a large amount of cooling water is adopted on the rollgang of the remaining 70-20 m close to the coiling machine for rapid cooling. In this way, the steel plate obtained by finishing can be kept at high temperature for at least 3-8 s, so that sufficient recrystallization is ensured; and then the steel plate is rapidly cooled to reach the coiling temperature, thus the formation of compact oxide skin is reduced or avoided, and then a situation that the removal difficulty of the oxide skin in subsequent acid pickling is increased is avoided.

4) Acid Continuous Rolling

This step is the continuous casting process; the hot-rolled coil obtained in step 3 is subjected to uncoiling, acid pickling, rinsing, drying, cold rolling and coiling, rather than normalizing treatment, thereby obtaining a cold hard coil with the thickness of 0.500±0.005 mm or 0.350±0.004 mm. That is, the embodiment can be used for preparing high-grade non-oriented silicon steel with the thickness of 0.50 mm and can also be used for preparing high-grade non-oriented silicon steel with the thickness of 0.35 mm.

Specifically, after being uncoiled, the hot-rolled coil obtained in step 3 is subjected to acid pickling through HCl; and after rinsing and drying, the hot-rolled coil is subjected to cold rolling and coiling to obtain the cold hard coil.

Preferably, three-stage acid pickling is carried out through HCl. The concentration of first-stage acid liquor is 50-80 g/L, and the concentration of $Fe^{2+}$ in the acid liquor is not greater than 130 g/L; the concentration of second-stage acid liquor is 90-120 g/L, and the concentration of $Fe^{2+}$ in the acid liquor is not greater than 90 g/L; the concentration of third-stage acid liquor is 140-160 g/L, and the concentration of $Fe^{2+}$ in the acid liquor is not greater than 50 g/L; during each-stage acid pickling, the temperature of the acid liquor is 75-85° C., the acid liquor contains a silicon steel acid pickling accelerant, and the silicon steel acid pickling accelerant accounts for 0.05-0.10% of the acid liquor by weight; and the temperature of rinsing water is 45-55° C., and the acid pickling and rinsing speed is controlled to be 100-180 mpm.

5) Post-Annealing Step

This step includes the annealing process, the cooling process, the coating process and the finishing process.

Specifically, finished product annealing is carried out on the cold hard coil obtained in step 4 in a mixed atmosphere of $H_2+N_2$ through a continuous annealing furnace, the finished product annealing temperature is 920-980° C., and the annealing time is 60±5 s; and cooling, coating and finishing are carried out on the annealed steel strip to obtain the finished product of the high-grade non-oriented silicon steel.

In this embodiment, the hot-rolled coil tissue does not have any fibrous tissue, so normalizing treatment is avoided; the annealing temperature is controlled to be high, and therefore even though the size of grains formed by direct recrystallization of the hot-rolled coil is small, the magnetic performance of the finally-obtained finished product of the non-oriented silicon steel can be guaranteed; and in addition, according to the embodiment, although normalizing treatment is avoided, secondary cold rolling or secondary annealing does not need to be additionally carried out in the acid continuous rolling step and the annealing process, so that the whole production method is simple in operation and low in cost Preferably, in the cooling process in this step, the steel strip obtained after finished product annealing is subjected to three-stage cooling; the first-stage cooling is high-temperature-stage slow cooling, and the steel strip is cooled from annealing temperature to 850° C. at a cooling speed of not greater than 5° C./s; the second-stage cooling is circulating gas jet controlled cooling, and the steel strip is continuously cooled from 850° C. to 350° C. or below at a cooling speed of not greater than 15° C./s; and the third-stage cooling is circulating water jet cooling, and the steel strip is continuously cooled from 350° C. to 100° C. or below. Therefore, the cooling internal stress of the steel plate is reduced more favorably when the cooling speed of the steel plate is lower, but the production cost may be greatly increased if the cooling stage is too long; and the residual stress of the steel plate can be effectively controlled to be not greater than 50 MPa at low cost by carrying out temperature controlled cooling according to the three-stage cooling mode, which is conducive to the optimization of the plate shape.

The steel plate cooled to 100° C. or below in annealing is subjected to coating and finishing, and the specific operation can be realized by an existing feasible coating and finishing technology, so no more description is made herein; and finally, the finished product of the non-oriented silicon steel with the thickness of 0.500±0.005 mm or 0.350±0.004 mm can be obtained.

In this embodiment, in a case that the thickness of the finished product of the non-oriented silicon steel is 0.500±0.005 mm, the iron loss is shown as $P_{1.5/50} \leq 3.8$ W/kg, and the magnetic induction intensity is shown as $B_{5000} \geq 1.71$; in a case that the thickness of the finished product of the non-oriented silicon steel is 0.350±0.004 mm, the iron loss is shown as $P_{1.5/50} \leq 3.3$ W/kg, and the magnetic induction intensity is shown as $B_{5000} \geq 1.70$; and the non-oriented silicon steel of the two specifications meets the standard requirement for the high-grade non-oriented silicon steel.

Compared with the prior art, the present invention has the following beneficial effects:

(1) the finished product of the non-oriented silicon steel prepared by the production method is excellent in magnetic performance, low in iron loss and high in magnetic induction intensity, and meets the requirements for high-grade non-oriented silicon steel with two specifications of 0.50 mm and 0.35 mm; and moreover, normalizing treatment is avoided before cold rolling, so that one technological process is avoided, and the production cost is low; and the requirements of electrical steel product upgrading and electric appliance product energy efficiency upgrading for low-cost high-grade silicon steel sheets can be met;

(2) on the design basis of elements such as Mn, S and N in the abovementioned chemical components and in combination with the control over the heating temperature (1,120-1,150° C.) and the temperature maintaining duration of the continuous casting billet, the production efficiency is guaranteed, the high-temperature finishing in subsequent finish rolling is facilitated, meanwhile, the probability of separating out fine MnS is reduced, and solid solution of precipitates such as MnS in the steel in the heating process is prevented; in addition, on the design basis of the elements such as Mn, C and Si in the chemical components, compared with the prior art, an austenite region is expanded, the temperature Art for transformation from austenite to ferrite is reduced, and the Art can be kept basically constant; the thickness of the intermediate billet after rough rolling is controlled to be large, and the finishing temperature in finish rolling is controlled to be in a two-phase region or a high-temperature ferrite region, so that high-temperature ferrite, rather than a deformed fiber structure as described in the Background Art, can be formed, and the high-temperature ferrite is a basic condition for subsequent recrystallization; further, in combination with the large rolling reduction of the last two passes of finish rolling, the high-temperature ferrite formed during finishing has more internal storage energy, which is beneficial for recrystallization of the high-temperature ferrite and removal of the fiber structure; and meanwhile, the low coiling temperature and the large rolling reduction of the last two passes of finish rolling are further controlled, thus a problem that a compact oxide skin is formed and increases the removal difficulty of the oxide skin in subsequent acid pickling is avoided.

In conclusion, through a series of abovementioned control, the objective of avoiding normalizing treatment before subsequent cold rolling is achieved; and it is guaranteed that the hot-rolled coil which is free of the fiber structure and cannot cause large acid pickling difficulty is obtained, and then the high-grade non-oriented silicon steel which is excellent in magnetic performance and free of surface corrugated defects is obtained;

(3) the annealing temperature is controlled to be high, and therefore even though the size of grains formed by direct recrystallization of the hot-rolled coil is small, the magnetic performance of the finally-obtained finished product of non-oriented silicon steel can be guaranteed; and in addition, according to the embodiment, although normalizing treatment is avoided, secondary cold rolling or secondary annealing does not need to be additionally carried out in the acid continuous rolling step and the annealing process, so that the whole production method is simple in operation and low in cost; and moreover, the cold rolling difficulty is reduced, and the risk of strip breakage in cold rolling and subsequent annealing is reduced; and (4) the finished product of the non-oriented silicon steel can be obtained through a process production line of molten iron desulphurization, converter smelting, RH refining, continuous casting, hot rolling, acid continuous rolling, annealing, cooling, coating and finishing; no extra process or device needs to be specially added for the high-grade non-oriented silicon steel; and the production line is universal for products of different grades.

The detailed descriptions listed above are only specific descriptions of the feasible embodiments of the present invention, and are not intended to limit the scope of protection of the present invention. Any equivalent implementation methods or changes that do not depart from the spirit of the art of the present invention should be included in the scope of protection of the present invention.

The following is a further illustration of the beneficial effects of this embodiment through four embodiments. Certainly, these four embodiments are only a part, not all, of the numerous variations contained in the present invention. Each of the four embodiments provides a non-oriented silicon steel, and the production method is as follows:

(1) Steel Smelting Step

In Embodiments 1-4, molten iron desulfurization, converter smelting and RH refining are sequentially carried out according to the abovementioned one embodiment of the present invention, and the chemical components of the obtained molten steel are shown in percent by mass in Table 1.

TABLE 1

| Chemical components (%) | C | S | Si | Mn | P | Sn | Nb | V | Ti | Mo | Cr | Ni | Cu | N |
|---|---|---|---|---|---|---|---|---|---|---|---|---|---|---|
| Embodiment 1 | 0.0023 | 0.0024 | 1.45 | 0.73 | 0.018 | 0.024 | 0.001 | 0.001 | 0.003 | 0.002 | 0.01 | 0.01 | 0.01 | 0.0013 |
| Embodiment 2 | 0.0023 | 0.0024 | 1.45 | 0.73 | 0.018 | 0.024 | 0.001 | 0.001 | 0.003 | 0.002 | 0.01 | 0.01 | 0.01 | 0.0013 |
| Embodiment 3 | 0.0035 | 0.0020 | 1.66 | 0.90 | 0.012 | 0.021 | 0.002 | 0.002 | 0.003 | 0.001 | 0.01 | 0.02 | 0.01 | 0.0015 |
| Embodiment 4 | 0.0035 | 0.0020 | 1.66 | 0.90 | 0.012 | 0.021 | 0.002 | 0.002 | 0.003 | 0.001 | 0.01 | 0.02 | 0.01 | 0.0015 |

As shown in Table 1, the chemical components in the Embodiments 1-4 meet the following conditions in percent by mass: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities, and $11 \times ([Si]-1.4\%) = 14 \times ([Mn]-0.7\%)$.

(2) Continuous Casting Step

According to the Embodiments 1-4, the tapped steel in step 1 is prepared into the continuous casting billet with the thickness of 220 mm by the continuous casting device.

(3) Hot Rolling Step

According to the Embodiments 1-4, the continuous casting billet obtained in step 2 is subjected to heating, multi-pass rough rolling, multi-pass finish rolling, cooling and coiling in sequence to obtain the hot-rolled coil.

In the multi-pass finish rolling, the rolling reduction of the last pass of finish rolling is not less than 30%, the total rolling reduction of the last two passes of finish rolling is not less than 50%; in addition, the steel plate obtained by finishing in finish rolling is subjected to two-stage cooling, the previous-stage cooling is natural slow cooling without water cooling and lasts for 3-8 s, and the later-stage cooling is water-cooling rapid cooling; and in addition, the heating temperature and the heat maintaining duration of the continuous casting billet before rough rolling, the thickness of the intermediate billet obtained after multi-pass rough rolling, the finishing temperature in finish rolling, the coiling temperature and the thickness of the hot-rolled coil are shown in Table 2.

TABLE 2

|  | Heating temperature (° C.) | Temperature maintaining duration (min) | Thickness of intermediate billet (mm) | Finishing temperature (° C.) | Coiling temperature (° C.) | Thickness of hot-rolled coil (mm) |
| --- | --- | --- | --- | --- | --- | --- |
| Embodiment 1 | 1130-1150 | 215 | 42 | 892 | 655 | 2.53 |
| Embodiment 2 | 1130-1150 | 215 | 42 | 895 | 648 | 2.51 |
| Embodiment 3 | 1130-1150 | 220 | 43 | 885 | 650 | 2.51 |
| Embodiment 4 | 1130-1150 | 220 | 43 | 890 | 640 | 2.52 |

Figure 1:
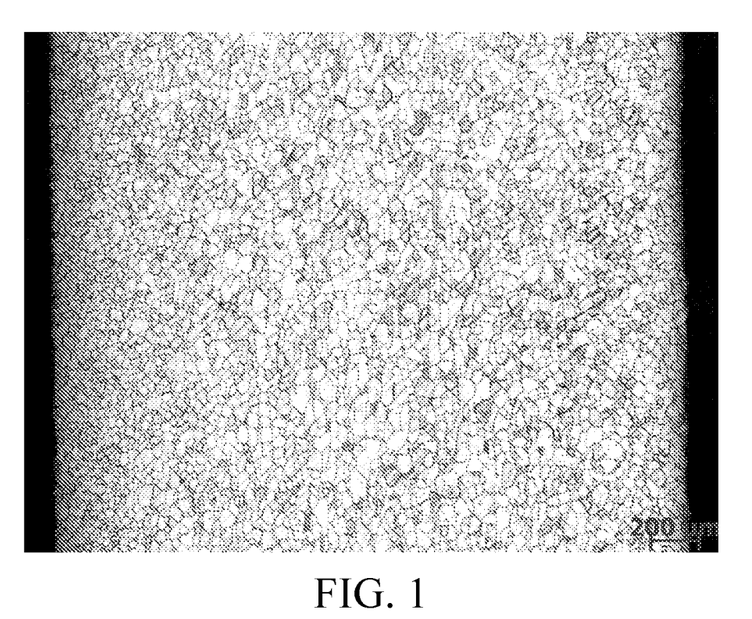
FIG. 1 is a microscopic metallographic structure picture of a hot-rolled coil according to an Embodiment 1 of the present invention.
Figure 2:
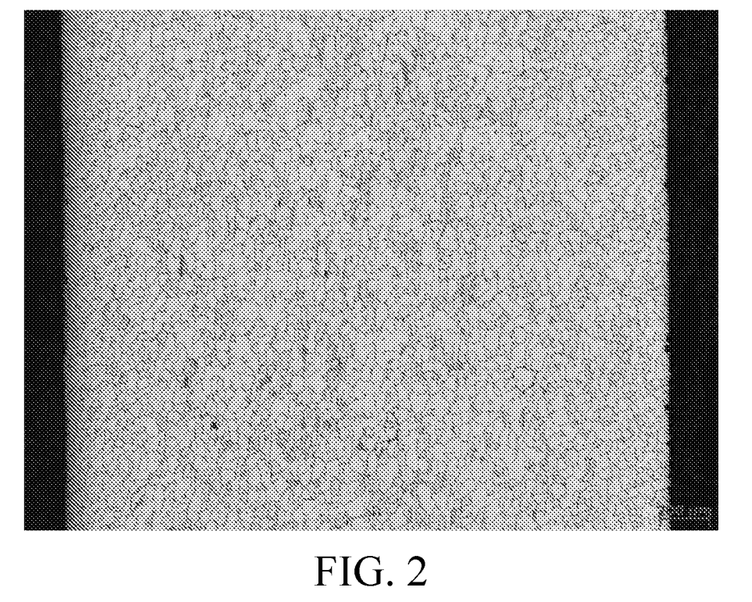
FIG. 2 is a microscopic metallographic structure picture of a hot-rolled coil according to an Embodiment 3 of the present invention.

Microscopic metallographic structure detection is carried out on the hot-rolled coils obtained in the Embodiments 1-4. FIG. 1 and FIG. 2 respectively show pictures of microscopic metallographic structure in the Embodiment 1 and the Embodiment 3; and the detection shows that in the Embodiments 1-4, high-temperature ferrite formed after finishing in finish rolling can further be prepared into a recrystallized structure, rather than a deformed fiber structure, so that a foundation is created for avoiding normalizing treatment before subsequent cold rolling.

(4) Acid Continuous Rolling Step

According to the Embodiments 1-4, the hot-rolled coils obtained in step 3 are subjected to uncoiling, acid pickling, rinsing, drying, cold rolling and coiling, rather than normalizing treatment, thereby respectively obtaining cold hard coils with the thicknesses of 0.503 mm, 0.350 mm, 0.501 mm and 0.349 mm. Moreover, the hot-rolled coils in the Embodiments 1-4 are low in oxide skin removal difficulty and ideal in removal effect during acid pickling, and an abnormal situation that the oxide skin is compact and cannot be effectively removed does not occur.

(5) Post-Annealing Step

According to the Embodiments 1-4, finished product annealing is carried out on the cold hard coils obtained in step 4 in the mixed atmosphere of $H_2+N_2$ through the continuous annealing furnace; and cooling, coating and finishing are carried out on the annealed steel strip to obtain the finished product of the non-oriented silicon steel. The finished product annealing temperature and the annealing time are respectively shown in Table 3.

TABLE 3

|  | Annealing temperature (° C.) | Annealing time (s) |
| --- | --- | --- |
| Embodiment 1 | 935 | 61 |
| Embodiment 2 | 945 | 63 |
| Embodiment 3 | 935 | 60 |
| Embodiment 4 | 945 | 62 |

The finished products of the non-oriented silicon steel obtained in the Embodiments 1-4 are free of surface corrugated defect and are respectively sampled for detection; and the detected magnetic performance is shown in Table 4.

TABLE 4

|  | Iron loss $P_{1.5/50}$ (W/kg) | Magnetic induction $B_{5000}$ (T) |
| --- | --- | --- |
| Embodiment 1 | 3.75 | 1.717 |
| Embodiment 2 | 3.22 | 1.709 |
| Embodiment 3 | 3.62 | 1.713 |
| Embodiment 4 | 3.15 | 1.705 |

According to the Embodiments 1-4, the non-oriented silicon steel is produced by one embodiment of the present invention; in the production process, normalizing treatment is avoided before cold rolling, secondary cold rolling or secondary annealing does not need to be additionally carried out in the acid continuous rolling step and the annealing process, and oxide skin on the surface of the hot-rolled coil is easy to remove in acid pickling; the whole production method is simple in overall operation, low in difficulty, low in production abnormity risk and low in cost; moreover, the obtained finished product of the non-oriented silicon steel is free of surface corrugation defect, and excellent in magnetic performance; as shown in Embodiments 1 and 3, in a case that the thickness of the obtained finished product is 0.500±0.005 mm, the iron loss is shown as $P_{1.5/50} \leq 33.8$ W/kg, and the magnetic induction intensity is shown as $B_{5000} \geq 1.71$; as shown in Embodiments 2 and 4, in a case that the thickness of the obtained finished product is 0.350±0.004 mm, the iron loss is shown as $P_{1.5/50} \leq 3.3$ W/kg, and the magnetic induction intensity is shown as $B_{5000} \geq 1.70$; and the non-oriented silicon steel of the two specifications (namely 0.50 mm and 0.35 mm) meets the standard requirements for the high-grade non-oriented silicon steel.

It should be noted again that Experimental Examples 1-4 are only examples in the embodiment, the embodiment is not limited to be implemented according to the Experimental Examples 1-4; and under the technical purpose of not breaking away from the embodiment, other embodiments different from the experimental examples are all included in the protection range of the present invention.

What is claimed is:

1. A production method of non-oriented silicon steel, comprising the following steps:
   1) Smelting steel by molten iron desulfurization, converter smelting and RH refining in sequence, to obtain a molten steel comprising the following chemical components in percent by mass: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities, and $11\times([Si]-1.4\%)=14\times([Mn]-0.7\%)$;
   2) Continuously casting the molten steel obtained in step 1 into a continuous casting billet with a thickness of more than 200 mm;
   3) Heating the continuous casting billet obtained in step 2 to reach a temperature between 1,120-1,150° C., and maintaining the temperature for more than 200 min; then carrying out multi-pass rough rolling to obtain an intermediate billet with a thickness of 40-45 mm; and then carrying out multi-pass finish rolling, cooling and coiling to obtain a hot-rolled coil with a thickness of 2.50±0.1 mm, the finishing temperature in finish rolling being 890±15° C., the rolling reduction of the last pass of finish rolling being not less than 30%, the total rolling reduction of the last two passes of finish rolling being not less than 50%, and the coiling temperature being 650±20° C.;
   4) Carrying out uncoiling, acid pickling, rinsing, drying, cold rolling and coiling on the hot-rolled coil obtained in step 3, rather than carrying out normalizing treatment, thereby obtaining a cold hard coil with a thickness of 0.500±0.005 mm or 0.350±0.004 mm; and
   5) Carrying out finished product annealing on the cold hard coil obtained in step 4 in a mixed atmosphere of $H_2+N_2$ through a continuous annealing furnace, the finished product annealing temperature being 920-980° C., and the annealing time being 60±5 s; and carrying out cooling, coating and finishing on the annealed steel strip to obtain a finished product of non-oriented silicon steel.

2. The production method of the non-oriented silicon steel according to claim 1, wherein in a case that the thickness of the finished product of the non-oriented silicon steel is 0.500±0.005 mm, the iron loss is shown as $P_{1.5/50} \leq 3.8$ W/kg, and the magnetic induction intensity is shown as $B_{5000} \geq 1.71$;
   or, in a case that the thickness of the finished product of the non-oriented silicon steel is 0.350±0.004 mm, the iron loss is shown as $P_{1.5/50} \leq 33.3$ W/kg, and the magnetic induction intensity is shown as $B_{5000} \geq 1.70$.

3. The production method of the non-oriented silicon steel according to claim 1, wherein in step 3, the continuous casting billet obtained in step 2 is heated to reach a temperature between 1,130-1,150° C., and the temperature is maintained for more than 200 min.

4. The production method of the non-oriented silicon steel according to claim 1, wherein in step 3, in the cooling process, two-stage cooling is carried out, the first-stage cooling is natural slow cooling without water cooling and lasts for 3-8 s, and the second-stage cooling is water-cooling.

5. The production method of the non-oriented silicon steel according to claim 1, wherein in the molten iron desulphurization process, the temperature of desulphurized molten iron is controlled to be not less than 1,320° C., the content of S is not greater than 0.0015% by mass, and a slagging-off rate is not less than 98%;
   in the converter smelting process, the desulphurized molten iron is mixed with scrap steel to be smelted in a converter, and the scrap steel accounts for 20-25% of the total mass of the molten steel; in a tapping process, a sufficient quantity of tin ingots are added into the molten steel according to the ratio of 0.015-0.035% by mass of Sn in the finished product; and after tapping is finished, a slag top deoxidizing agent is added into the molten steel;
   in the RH refining process, the molten steel is subjected to decarburization treatment in a pre-vacuumized RH refining furnace; then titanium ferrosilicon and metal manganese are added into the molten steel according to an alloying solution that the finished product contains 1.4-1.7% by mass of Si, and 0.7-0.95% by mass of Mn, and $11\times([Si]-1.4\%)=14\times([Mn]-0.7\%)$; tapping is carried out more than 7 min after net circulation; and a desulfurizing agent is added into the molten steel for deep desulfurization treatment during net circulation.

6. The production method of the non-oriented silicon steel according to claim 1, wherein in the acid pickling process, the hot-rolled coil obtained in step 3 is uncoiled and then subjected to three-stage acid pickling through HCl; wherein the concentration of a first-stage acid liquor is 50-80 g/L, and the concentration of $Fe^{2+}$ in the first-stage acid liquor is not greater than 130 g/L; the concentration of a second-stage acid liquor is 90-120 g/L, and the concentration of $Fe^{2+}$ in the second-stage acid liquor is not greater than 90 g/L; the concentration of a third-stage acid liquor is 140-160 g/L, and the concentration of $Fe^{2+}$ in the third-stage acid liquor is not greater than 50 g/L;
   during each stage of acid pickling, the temperature of the acid liquor is 75-85° C., the acid liquor contains a silicon steel acid pickling accelerant, and the silicon steel acid pickling accelerant accounts for 0.05-0.10% of the acid liquor by weight; and
   the temperature of rinsing water is 45-55° C., and the acid pickling and rinsing speed is controlled to be 100-180 mpm.

7. The production method of the non-oriented silicon steel according to claim 1, wherein in step 5, the steel strip obtained after finished product annealing is subjected to three-stage cooling; the first-stage cooling is high-temperature-stage slow cooling, and the steel strip is cooled from annealing temperature to 850° C. at a cooling speed of not greater than 5° C./s; the second-stage cooling is circulating gas jet controlled cooling, and the steel strip is continuously cooled from 850° C. to 350° C. or below at a cooling speed of not greater than 15° C./s; and the third-stage cooling is circulating water jet cooling, and the steel strip is continuously cooled from 350° C. to 100° C. or below.

8. A production method of non-oriented silicon steel, comprising the following steps:
   1) Smelting steel by molten iron desulfurization, converter smelting and RH refining in sequence, to obtain a molten steel comprising the following chemical components in percent by mass: 0.002-0.004% of C, not greater than 0.003% of S, 1.4-1.7% of Si, 0.7-0.95% of Mn, not greater than 0.03% of P, 0.015-0.035% of Sn, not greater than 0.004% of Nb, not greater than 0.004% of V, not greater than 0.005% of Ti, not greater than 0.004% of Mo, not greater than 0.03% of Cr, not greater than 0.03% of Ni, not greater than 0.03% of Cu, not greater than 0.003% of N, and the balance Fe and inevitable impurities, and 11×([Si]-1.4%)=14×([Mn]-0.7%);

2) Continuously casting the molten steel obtained in step 1 into a continuous casting billet with the thickness of more than 200 mm;

3) Heating the continuous casting billet obtained in step 2 to reach a temperature between 1,120-1,150° C., and maintaining the temperature for more than 200 min; then carrying out multi-pass rough rolling to obtain an intermediate billet with a thickness of 40-45 mm; then carrying out multi-pass finish rolling, and coiling to obtain a hot-rolled coil with a thickness of 2.50±0.1 mm, the finishing temperature in finish rolling being (Ar1-40)±15° C., Ar1 representing the temperature for transformation from austenite to ferrite, the rolling reduction of the last pass of finish rolling being not less than 30%, the total rolling reduction of the last two passes of finish rolling being not less than 50%, and the coiling temperature being 650±20° C.; and carrying out two-stage cooling on the steel plate obtained by finishing in finish rolling before coiling, the first-stage cooling being natural slow cooling without water cooling and lasting for 3-8 s, and the second-stage cooling being water-cooling rapid cooling;

4) Carrying out uncoiling, acid pickling, rinsing, drying, cold rolling and coiling on the hot-rolled coil obtained in step 3, rather than carrying out normalizing treatment, thereby obtaining a cold hard coil with a thickness of 0.500±0.005 mm or 0.350±0.004 mm; and 5) Carrying out finished product annealing on the cold hard coil obtained in step 4 in a mixed atmosphere of $H_2+N_2$ through a continuous annealing furnace, the finished product annealing temperature being 920-980° C., and the annealing time being 60±5 s; and carrying out cooling, coating and finishing on the annealed steel strip to obtain a finished product of non-oriented silicon steel.

* * * * *